(12) United States Patent
Taylor et al.

(10) Patent No.: US 7,816,911 B2
(45) Date of Patent: Oct. 19, 2010

(54) ELECTROMAGNETIC SENSOR SYSTEMS

(75) Inventors: G. Brandt Taylor, Berlin, MA (US); Steven E. Beard, Berlin, MA (US)

(73) Assignee: Digisensors, Inc., Berlin, MA (US)

( * ) Notice: Subject to any disclaimer, the term of this patent is extended or adjusted under 35 U.S.C. 154(b) by 459 days.

(21) Appl. No.: 11/940,603

(22) Filed: Nov. 15, 2007

(65) Prior Publication Data

US 2008/0116882 A1 May 22, 2008

Related U.S. Application Data (63) Continuation-in-part of application No. 11/846,907, filed on Aug. 29, 2007, which is a continuation-in-part of application No. 11/325,143, filed on Jan. 4, 2006, now Pat. No. 7,511,476, which is a continuation-in-part of application No. PCT/US2005/007363, filed on Mar. 7, 2005.

(60) Provisional application No. 60/841,061, filed on Aug. 30, 2006, provisional application No. 60/841,322, filed on Aug. 31, 2006, provisional application No. 60/853,568, filed on Oct. 23, 2006, provisional application No. 60/859,132, filed on Nov. 15, 2006, provisional application No. 60/861,187, filed on Nov. 27, 2006.

(51) Int. Cl.
*G01B 7/14* (2006.01)
(52) U.S. Cl. .............................. 324/207.15; 324/207.24
(58) Field of Classification Search ................................ 324/207.15–207.18, 207.24–207.26, 239; 73/862.626, 718, 724
See application file for complete search history.

(56) References Cited

U.S. PATENT DOCUMENTS 2,452,156 A 10/1948 Schover ...................... 177/351

(Continued)

FOREIGN PATENT DOCUMENTS

JP 06242199 A 9/1994

(Continued)

OTHER PUBLICATIONS

International Search Report dtd Feb. 12, 2009 for PCT/US07/84798. Applicant: Digisensors, Inc.

*Primary Examiner*—Bot L LeDynh
(74) *Attorney, Agent, or Firm*—Burns & Levinson LLP; Jacob N. Erlich; Orlando Lopez (57) ABSTRACT

A variable inductance position sensor is described. The sensor includes a housing that is typically cylindrical in shape. The housing includes an open end and a closed end forming a cavity therein. A coil support member is affixed at one end to the closed end of the housing, or the coil support member may itself seal the housing at the closed end. The coil support member includes a coil assembly that includes a coil both of which are rigidly affixed to the coil support member. In this way, the coil is maintained in a fixed and predetermined orientation with respect to the housing. The combination of housing, coil support member and coil assembly and the coil forms an inner assembly. The coil support member includes a bore that forms a central annular region and the coil support member then forms an outer annular region as well. In addition, the housing may also include a passageway to allow the passage of lead wires from the coil assembly to the exterior of the sensor. The sensor further includes an actuator that includes inner surfaces on the outer and inner projection surfaces, respectively.

26 Claims, 5 Drawing Sheets

U.S. PATENT DOCUMENTS

| | | | |
|---|---|---|---|
| 3,350,660 A | 10/1967 | Engdahl et al. | 331/65 |
| 3,397,364 A | 8/1968 | Crandall | 331/65 |
| 3,461,400 A | 8/1969 | Koda | 331/65 |
| 3,521,158 A | 7/1970 | Morrow et al. | 324/34 |
| 3,609,580 A | 9/1971 | Thompson et al. | 331/65 |
| 3,619,805 A | 11/1971 | Bean | 331/65 |
| 3,701,041 A | 10/1972 | Adler et al. | 331/65 |
| 3,732,503 A | 5/1973 | Rapp et al. | 331/65 |
| 3,735,244 A | 5/1973 | Gumtau et al. | 323/51 |
| 3,756,081 A | 9/1973 | Young | 73/336.5 |
| 3,760,392 A | 9/1973 | Stich | 340/200 |
| 3,818,369 A | 6/1974 | Brocker | 331/65 |
| 3,891,918 A | 6/1975 | Ellis | 324/34 D |
| 4,068,189 A | 1/1978 | Wilson | 331/65 |
| 4,284,961 A | 8/1981 | Landau | 331/65 |
| 4,310,807 A | 1/1982 | McKee | 331/65 |
| 4,618,835 A | 10/1986 | Wilson | 331/65 |
| 4,663,542 A | 5/1987 | Buck et al. | 327/517 |
| 4,685,678 A | 8/1987 | Frederiksen | 273/148 B |
| 4,809,742 A | 3/1989 | Grau | 137/554 |
| 5,079,502 A | 1/1992 | Rogacki et al. | 324/207.19 |
| 5,103,172 A | 4/1992 | Stoll | |
| 5,142,226 A | 8/1992 | Sakamoto et al. | 324/207.24 |
| 5,172,298 A | 12/1992 | Shimizu et al. | 361/152 |
| 5,279,163 A | 1/1994 | D'Antonio et al. | 73/728 |
| 5,420,507 A | 5/1995 | Laskowski | |
| 5,767,672 A | 6/1998 | Guichard et al. | 324/236 |
| 6,215,365 B1 | 4/2001 | Kurkovskiy | 331/65 |
| 6,335,619 B1 | 1/2002 | Schwab et al. | 324/207.26 |
| 6,532,834 B1 | 3/2003 | Pinto et al. | 73/862.626 |
| 6,639,759 B2 | 10/2003 | Inoguchi et al. | 360/261.1 |
| 6,703,831 B1 | 3/2004 | Keely et al. | |
| 6,731,119 B2 | 5/2004 | Haffner et al. | 324/635 |
| 7,046,018 B2 | 5/2006 | Toda et al. | 324/679 |
| 2004/0056748 A1 | 3/2004 | Masaki et al. | 336/119 |

FOREIGN PATENT DOCUMENTS

| | | |
|---|---|---|
| WO | WO 2007/026799 | 3/2007 |

ELECTROMAGNETIC SENSOR SYSTEMS

CROSS REFERENCE TO RELATED APPLICATIONS

This application is a continuation-in-part of co-pending U.S. application Ser. No. 11/846,907, entitled ELECTROMAGNETIC SENSOR SYSTEMS, filed Aug. 29, 2007, which in turn is a continuation-in-part of U.S. patent application Ser. No. 11/325,143, entitled ELECTROMAGNETIC SENSOR SYSTEMS AND METHODS OF USE THEREOF, filed on Jan. 4, 2006, now U.S. Pat. No. 7,511,476 which is a continuation-in-part of International Application S.N. PCT/US2005/007363, filed Mar. 7, 2005, entitled INDUCTION SENSOR, and which claims priority of U.S. Provisional Patent application Ser. No. 60/841,061, entitled INDUCTION LINEAR SENSOR SYSTEM, filed on Aug. 30, 2006, of U.S. Provisional Patent application Ser. No. 60/841,322, entitled HIGH TEMPERATURE INDUCTIVE SENSOR, filed on Aug. 31, 2006, and of U.S. Provisional Patent application Ser. No. 60/853,568, entitled BRAKE LINING THICKNESS SENSOR, filed on Oct. 23, 2006; and also claims priority of U.S. Provisional Patent Application Ser. No. 60/859,132, entitled INDUCTIVE SENSORS FOR VEHICLE STEERING ANGLE POSITION, filed on Nov. 15, 2006, and of U.S. Provisional Patent Application Ser. No. 60/861,187, entitled INDUCTIVE SENSORS FOR VEHICLE STEERING ANGLE POSITION, filed on Nov. 27, 2006; all of which are incorporated by reference herein.

BACKGROUND

These teachings relate to electro-mechanical measurement and control systems.

One class of position sensors commonly used in feedback control systems are linear variable differential transformer (LVDT) sensors. These sensors consists of a cylindrical array of a primary and typically two secondary windings where a cylindrical core passes through the centre of each of the windings. The primary windings is energized with a constant amplitude A.C. supply at a frequency of 1 to 10 kHz. This produces an alternating magnetic field in the centre of the transducer which induces a signal into the secondary windings that is a function of the position of the cylindrical core relative to the primary and secondary windings. Typically, when the core is positioned at the centre of the two secondary windings, a zero signal is derived. Movement of the core from this point in either direction causes the signal to increase. As the windings are wound in a particular precise manner, the signal output has a linear relationship with the actual mechanical movement of the core. The secondary output signal is then processed by a phase-sensitive demodulator which is switched at the same frequency as the primary energizing supply. This results in a final output which, after rectification and filtering, gives an output proportional to the core movement and also indicates its direction, positive or negative from the central zero point.

However, the LVDT output may not be sufficiently robust in terms of dynamic range, and moreover the output may also be adversely affected by cable capacitance and thermal drift. What is needed in the art then is a position sensor that is a low cost replacement for existing LVDT and is more resilient in terms of the sensor output being affected by temperature and cable capacitance.

BRIEF SUMMARY

In one embodiment, the system of these teachings includes an oscillator circuit. In one instance, the sensing element is a variable reactance element.

For a better understanding of these teachings, together with other and further needs thereof, reference is made to the accompanying drawings and detailed description and its scope will be pointed out in the appended claims.

BRIEF DESCRIPTION OF THE DRAWINGS

These and other features, aspects, and advantages of the present invention will become better understood with regard to the following description, appended claims, and accompanying drawings. The drawings are not necessarily to scale, emphasis instead being placed on illustration of principles of the invention. The drawings include the following figures:

DETAILED DESCRIPTION

An embodiment of the system of these teachings is shown in FIGS. 1a-1d. In particular, a sensor 100 includes a housing 102 that is typically cylindrical in shape. The housing includes an open end and a closed end forming a cavity therein. A coil support member 104 is affixed at one end to the closed end of the housing 102, or the coil support member 104, may itself seal the housing 102 at the closed end. The coil support member 104 includes a coil assembly 108 that includes coil 108a both of which are rigidly affixed to the coil support member 104. In this way, the coil 108a is maintained in a fixed and predetermined orientation with respect to the housing 102.

The combination of housing 102, coil support member 104 and coil assembly 108 and coil 108a forms an inner assembly. The coil support member 104 includes a bore that forms a central annular region 112 and the coil support member 104 then forms an outer annular region 110 as well. In addition, housing 102 may also include a passageway 114 to allow the passage of lead wires 116 from the coil assembly 108 to the exterior of the sensor 100.

Sensor 100 further includes an actuator 120 that includes inner surfaces 122a and 124a on the outer and inner projection surfaces, 122 and 124, respectively. Inner surface 122 is configured and oriented to be able to be slidably received within the outer region 110. Similarly, inner surface 124 is configured and oriented to be slidably received within the central annular region 112. In one embodiment, the inner surfaces 122, the inner surfaces 124, or both may be tapered as depicted in FIG. 1a-d.

Figure 1A:
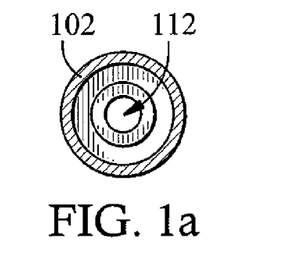
FIG. 1a is an end view of an embodiment of the system of these teachings.
Figure 1B:
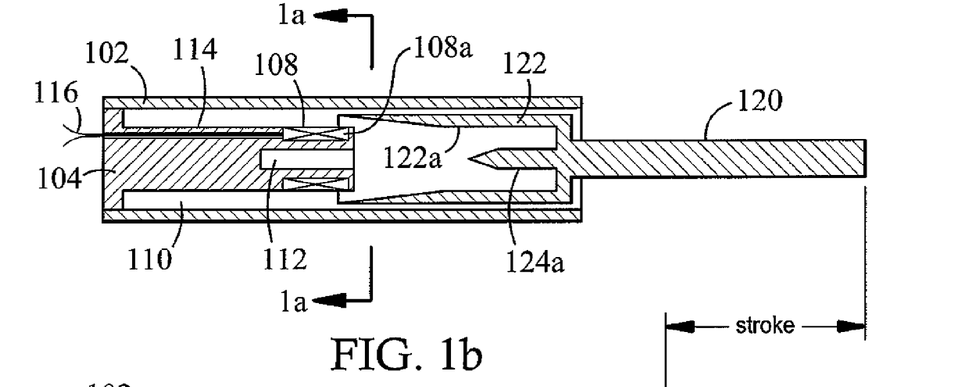
FIG. 1b is a side cut-away view of another embodiment of the system of these teachings in which the actuator is in a withdrawn position.
Figure 1C:
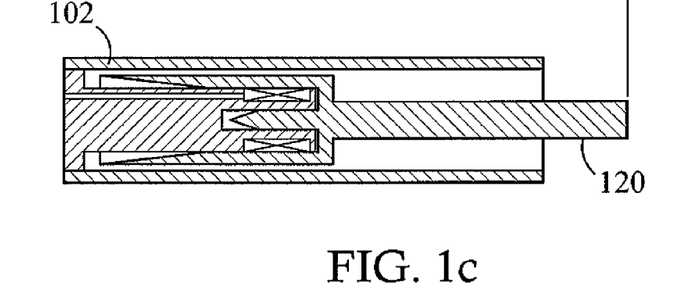
FIG. 1c is a schematic representation of yet another embodiment of the system of these teachings in which the actuator is in an inserted position.
Figure 1D:
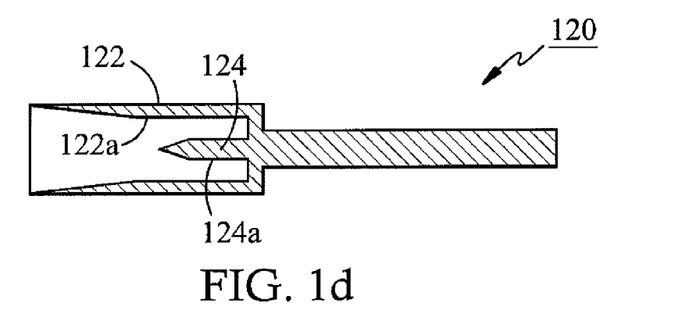
FIG. 1d is a side view of one embodiment of the actuator of the system of these teachings.

In one embodiment, the actuator 120 and support member 104 may be constructed from soft ferrite material. In this embodiment, the magnetic permeability of the flux path will increase as the actuator is moved inward as depicted in 1c and decrease as the actuator moves outward as depicted in FIG. 1b. In this way, the inductance of the coil 108 changes as a function of the position of the actuator 120 in a known and predicable manner.

In another embodiment, the actuator 120 and support member 104 may be constructed from a non-ferrous conductor such as Aluminum or Copper. In this embodiment, the non-ferrous metal need only be on the surfaces of actuator 120 and support member. In this embodiment, the actuator 120 may be almost any suitable material, for example and in no way meant to be limiting, the actuator 120 may be constructed from steel or plastic, where the choice of the material is a function of the system in which the position sensor 100 is to be used. In this embodiment, as the actuator 120 is moved inwardly, i.e., from position depicted in FIG. 1b to the position depicted in FIG. 1c, the magnetic permeability of the flux path surrounding coil 108 will decrease and the magnetic permeability of the coil 108 will increase as the actuator 120 is moved outwardly, i.e., From the position depicted in FIG. 1c to the position depicted in FIG. 1b.

Figure 2A:
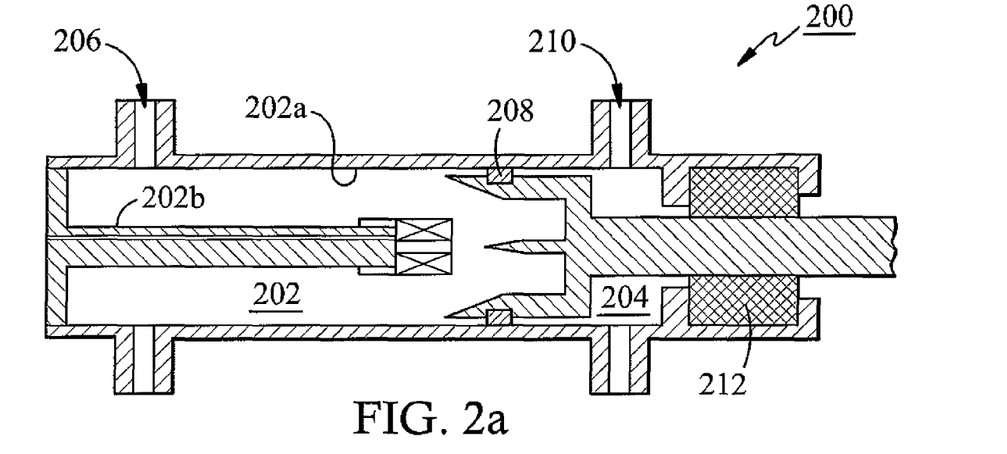
FIGS. 2a-2b depict an embodiment of a smart actuator of these teachings.
Figure 2B:
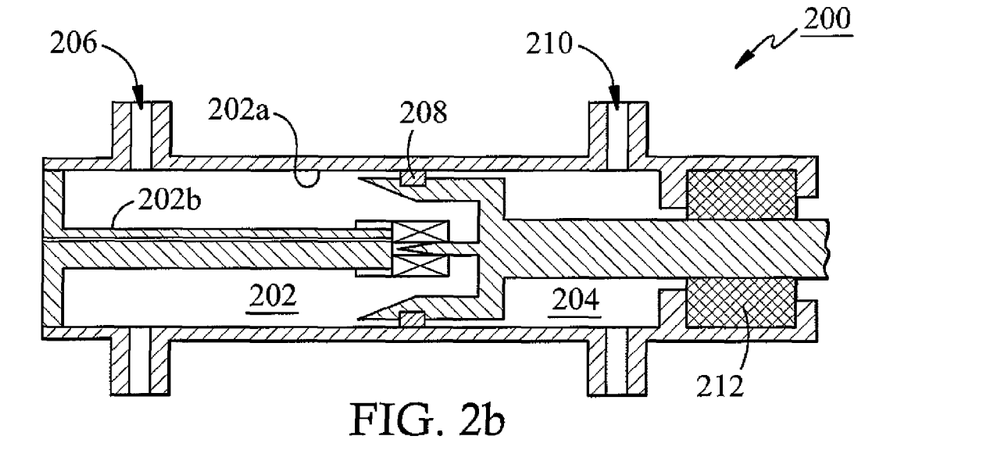

FIG. 2 depicts an actuator that incorporates the position sensor described above with reference to FIGS. 1a-c. In particular, FIGS. 2a and 2b depict a "smart actuator", i.e., an actuator that includes a position sensor for position feedback. The smart actuator 200 includes the elements of the position sensor described above with respect to FIGS. 1a-1c. In addition, the smart actuator includes chambers 202 and 204 formed within the interior of the housing 102. Chamber 202 is formed within the housing 102 and is bound by the interior wall 202a of the housing 102 and 202b of the coil support member 104, by the end 202c of the actuator 120, and seal 208. Chamber 204 is bound by the interior wall of the housing 204a, the exterior wall 204b of actuator 120, and seal 212.

The actuator depicted in FIGS. 2a-2b may be a pneumatic or hydraulic actuator. In operation, the actuator is moved by alternatively pressurizing chambers 202 and 204 via ports 206 and 210, respectively.

Figure 3:
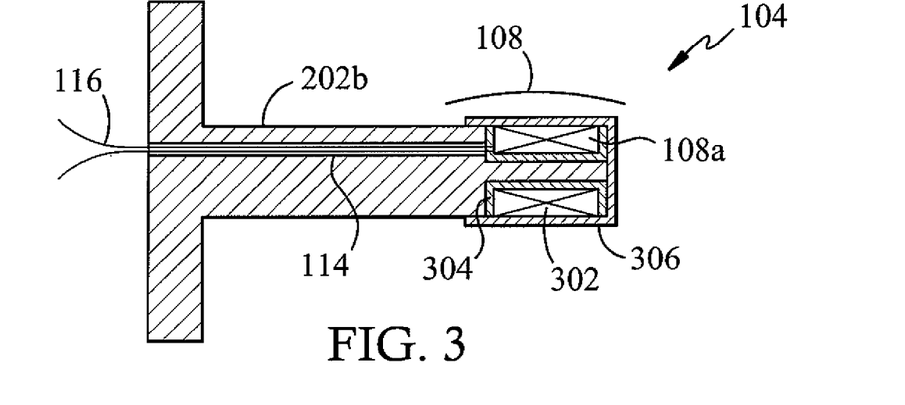
FIG. 3 depicts an embodiment of the coil support member of these teachings.

FIG. 3 depicts in greater detail the coil assembly 108 and coil support member 104. As described above, the coil support member 104 includes the passageway 114 that provides a passageway for the lead wires 116 to pass from the coil assembly 108 to the exterior of the coil support member 104. In one embodiment, the coil assembly 108 includes a coil of conductive wire 302 wound upon a bobbin 304 and encased in shell 306. In the event that the smart actuator 200 is powered by oil or other hydraulic fluid, it is advantageous to separate the coil wire insulation and the bobbin 304 from the oil or hydraulic fluid. Oil, or hydraulic fluid, may cause plastic materials, such as wire insulation, to swell and lose their physical integrity or become physically weak and break or wear off easily. This may lead to electrical interconnection issues, short circuits in the coil, or other problems. In this embodiment, the shell 306 may be a metal shell that is used to separate the coil wire insulation and the bobbin 304 from the oil o hydraulic fluid. The shell 306 may be made of Inconel or austenitic stainless steel, or other suitable metal. In this embodiment, because the surface 306 is in close proximity to the coil assembly 108, the shell 306 will interact with the magnetic field produced by the coil. Because of the conductive aspects of the shell due to the construction being of a metal, the shell 306 will negatively effect the magnetic field generated by the coil 108 and adversely effect the dynamic range of the frequency change realized by the sensor over the length of the measurement stroke. One possible method to mitigate this effect would be to wind the coil on a non-metallic bobbin of greater sectional thickness.

Alternatively, the coil assembly 108 may be wound on a bobbin 304 that is made of a ceramic material and in which the coil wire is aluminum magnet wire that has an anodized surface. The anodized surface of the aluminum magnet wire acts will act to electrically insulate the aluminum magnet wire. The bobbin material may be alumina. In addition, in this alternative embodiment various ceramic cements may be used for sealing the lead wire 116 in the passageway 114. With the ceramic construction materials and the use of the anodized aluminum magnet wire, the metal shell 306 may be not needed. If the shell 306 is not used there will not be a negative effect on the overall dynamic range of the frequency change with relation to overall length of the actuator measurement stroke.

Figure 4A:
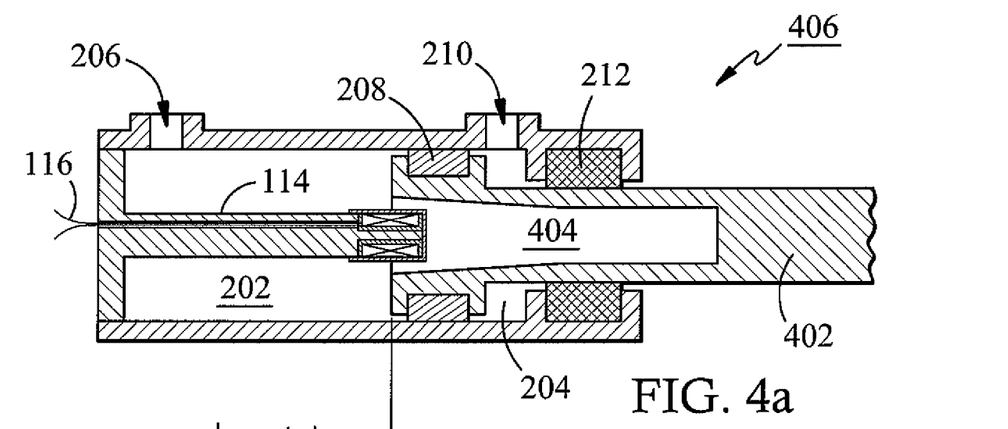
FIGS. 4a and 4b depict another embodiment of the system of these teachings.
Figure 4B:
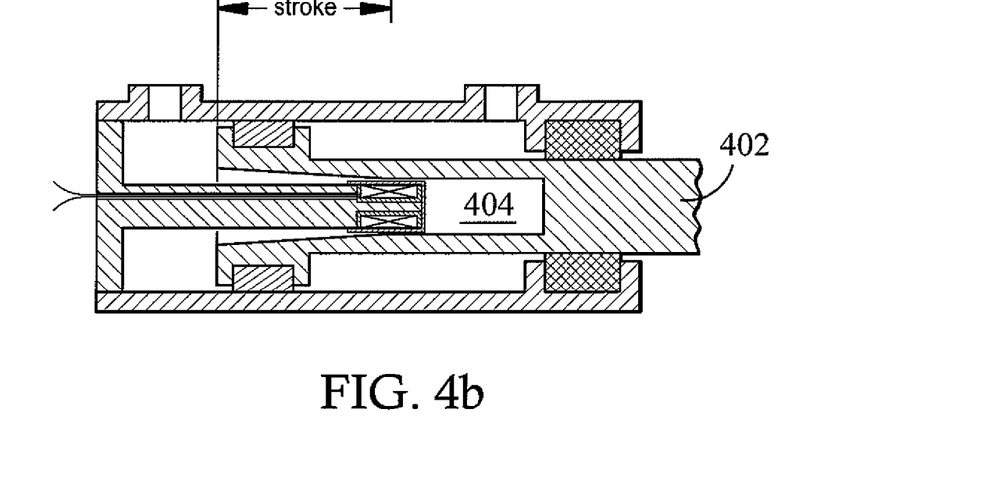

FIG. 4 depicts another embodiment of the piston. In particular in this embodiment, piston 402 does not include the inner projection surface 124 of the piston 120 in FIGS. 1a-1d. In this embodiment, the piston 402 includes an inner cavity 404 that is sized and configured to extend coaxially about the coil support member 104 and coil assembly 108. In addition, in this embodiment, the coil support member 104 does not include center aperture 112.

The tapered inner surface 402 of piston 400 is typically an electrical conductor. Piston 400 may be steel, stainless steel or any metal that is suitable and appropriate for the particular actuator application. In another embodiment, the surface 402 is composed of a high conductivity metal, for example, copper or aluminum and which may be deposited on the surface 402 of piston 400.

In general, sensor performance is improved by winding the coil assembly 108 such that the turns of the coil 108a are in close proximity to the surface 110 or 402. In one embodiment, a coil 108a that has 6 layers of 40 turns each produces improved performance over a coil with 12 layers of 20 turns.

Figure 5A:
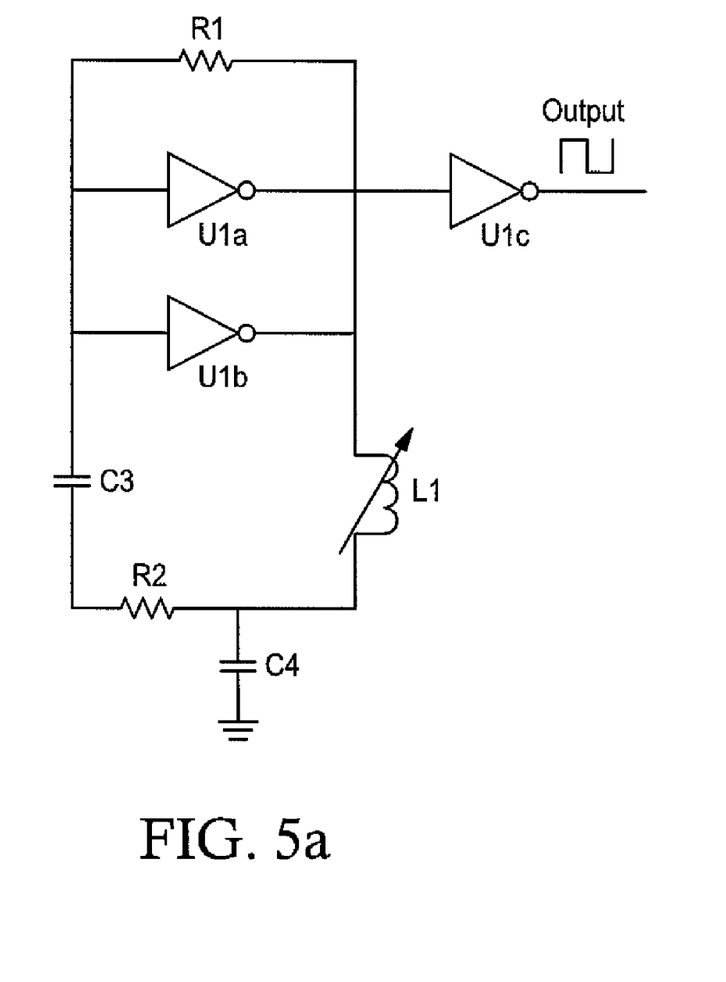
FIGS. 5a and 5b depict schematic diagrams of sensing circuits of these teachings.

FIG. 5a depicts a circuit used with the sensors of this invention. The circuit has a square wave output. The period of the square wave is used to indicate position of the sensor in its travel. An embodiment of the system of these teachings is shown in FIG. 5a. The circuit shown in FIG. 5a is a tuned oscillator circuit. The tuned oscillator circuit is comprised of an amplifier (U1a, U1b, and U1c) and two reactive components, an inductor L1 and a capacitor C4. L1 and C4 are in series connection with C4 connected to ground (return) and L1 connected to the output of the amplifier (U1a, U1b, and U1c). The frequency of the oscillator is:

$$F = \frac{1}{2\pi\sqrt{L1*C}}$$

In one embodiment, the inductor L1 is a variable inductor and is the sensing component. In that embodiment, the capacitor C4 is a fixed value capacitor (fixed capacitance). In another embodiment, the physical structure that comprises the inductor L1 also exhibits variable capacitance (as, for example, but not limited to, the situation in which the electric and magnetic fields of physical structure are modified while performing a measurement). It should be noted that the conventional sources of DC and oscillator power are not shown in FIGS. 5a and 5b. The placement and configuration of such sources is conventional.

In one embodiment, the amplifiers) (having sections U1a, U1b, and U1c) shown in FIG. 5a is a high speed CMOS hex inverter. The resistor R2 can be used to bias the input of the amplifier to compensate for the leakage current. The resistor R3 and capacitor C3 provide the feedback path. The oscillator is AC coupled by capacitor C3 so that there is no DC voltage path through the oscillator. Resistor R2 can influence the feedback path of the circuit. In one embodiment, the resistance value of R2 can chosen so that when the variable reactance is obtained by placing a conducting non magnetic surface, such as, but not limited to, copper, in proximity to a magnetic field producing component, such of variation of reactance will cause will cause the frequency of the circuit to increase, while, when a ferromagnetic surface, such as, but not limited to, steel, is placed proximity to the magnetic field producing component, such a variation will cause the frequency to decrease. Capacitors C1 and C2 are connected in parallel to one another and provide an electrical connection between ground and the variable inductor L1. Capacitor c1 has a capacitance that has a positive temperature coefficient and C2 has a capacitance that has a negative temperature coefficient, such that C1 and C2 are selected reduce a temperature induced drift of the frequency of the oscillator circuit.

In another embodiment, a transistor amplifier or operational amplifier can be used in place of hex inverter U1a, U1b, and U1c. In one instance, two signals can be generated from the oscillator for use as output. One signal is a square wave and the other signal is a sine wave, both have the same frequency.

Figure 5B:
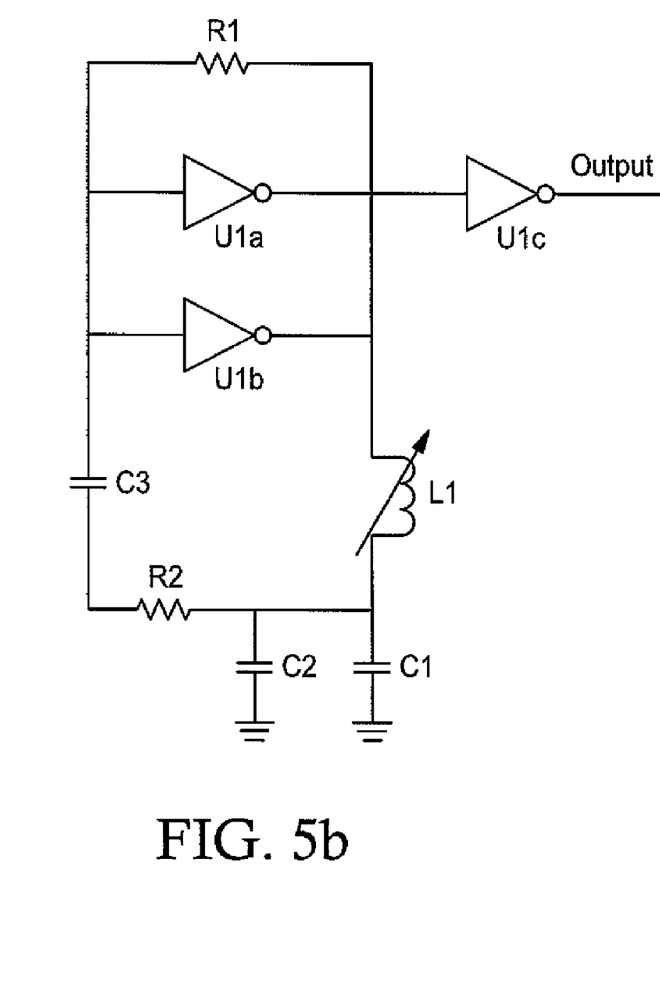

Another embodiment of the system of these teachings is shown in FIG. 5b. In FIG. 5b, Capacitors C1 and C2 replace capacitor C4 of FIG. 5a. Capacitors C1 and C2 are connected in parallel and have an equivalent capacitance equal to the sum of the capacitance of capacitors C1 and C2. In one instance, the two capacitors C1 and C2 provide temperature compensation in the circuit. In that instance, capacitor C1 has a capacitance vs. temperature relation that is positive. Capacitor C2 has a capacitance vs. temperature relation that is negative. By judicious choice of the capacitance values of C1 and C2 temperature induced frequency drift of the sensor output can be minimized. In another embodiment, the capacitance versus temperature relationship of each of the two capacitors C1 and C2 is selected such that a desired variation of the sensor output versus temperature can be obtained. In the embodiment shown in FIG. 5b, U1a, U1b, and U1c are three sections of a 74HC04 hex inverter.

An electronic circuit, such as that shown in FIGS. 5a, 5b, capable of providing an output at a first frequency and having the output affected by the changes in a variable reactance, i.e., a variable inductor or capacitor, is utilized as an output indicator. In operation, as the actuator moves toward and away from the coil 108a, the inductance of the coil changes and the frequency of the signal produced by the oscillator circuit changes accordingly. Thus, any oscillator that produces an output that may be affected by a variable reactance may be used to provide an output signal indicative of the position of the actuator relative to the coil.

Figure 6:
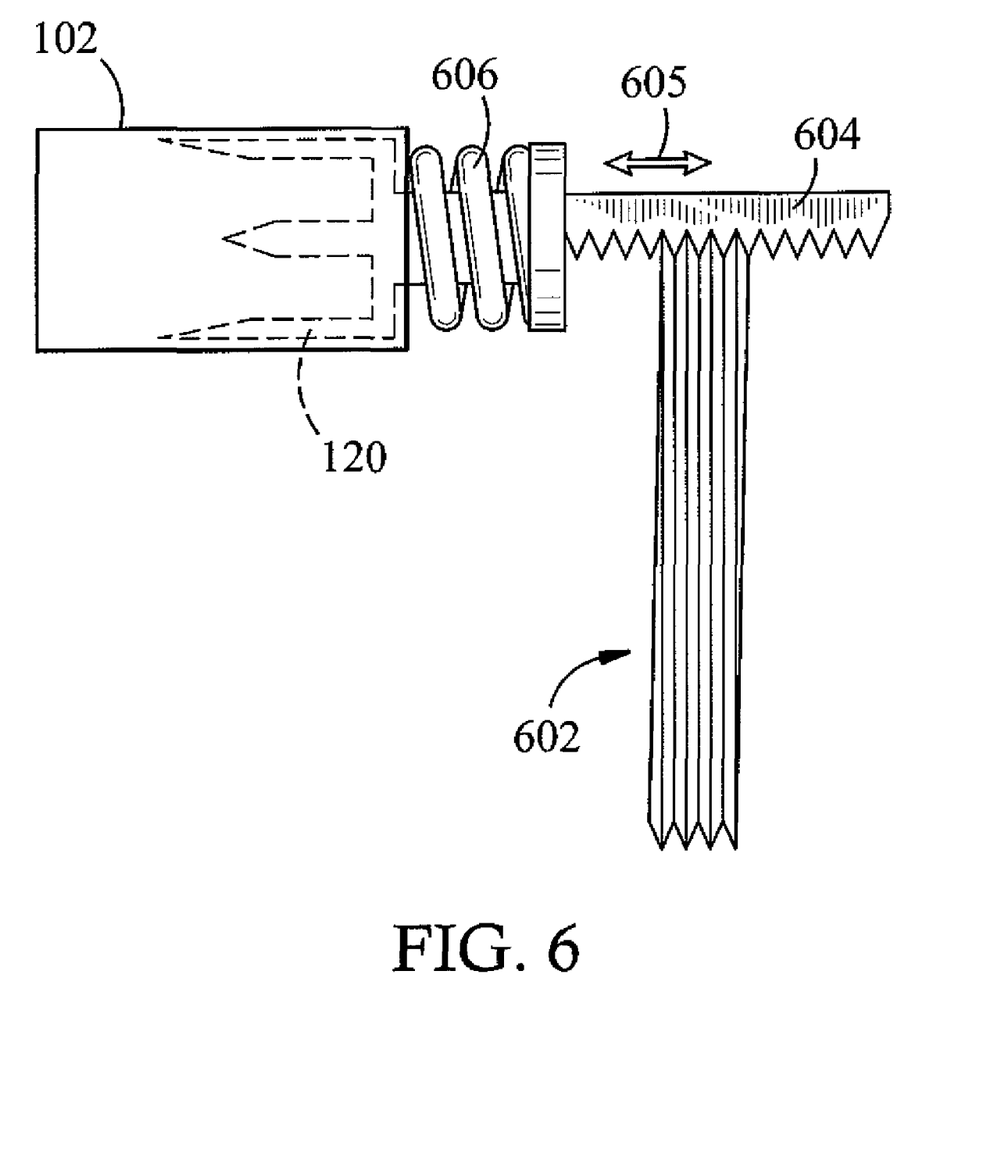
FIG. 6 depicts a schematic representation of one embodiment to adjust the position of an actuator of the system of these teachings.

As an example only and in no way meant to be limiting, FIG. 6 depicts one embodiment of the sensor depicted in FIGS. 1, 2, 3 and 4 to detect and measure the movement and angular position of a rotary system, such as an automobile steering wheel or the position of a motor. As described above, the housing 102 is fixed and the actuator 120 is able to move into and out of the housing 102. As the worm gear 602 is attached to the steering wheel or motor and is coupled to rack gear 604 in order to move rack gear 604 in and out in the direction 605. The actuator 120 is coupled to rack gear 604 and is moved in and out in a conventional manner adjusting the inductance of the coil assembly 108 as described above.

While the present invention has been particularly shown and described with references to preferred embodiments thereof, it will be understood by those skilled in the art that various changes in form and details may be made therein without departing from the spirit and scope of the invention as defined by the appended claims. All the features disclosed in this specification, including any accompanying claims, abstract, and drawings, may be replaced by alternative features serving the same, equivalent or similar purpose, unless expressly stated otherwise.

What is claimed is:

1. A sensor comprising:
  an inductor having a variable reactance including:
  a housing having an open end, a closed end having a first passageway and an interior chamber;
  a coil support member disposed within said interior chamber and having a first end closing affixed to said closed end, a second end, and a second passageway extending through said coil support member from said second end and aligned with said first passageway, wherein said first and second passageway allow communication from said second end to the exterior of said housing;
  a coil of wire disposed on said second end having two or more lead wires extending through said second and first passageways from said coil to the exterior of said housing;
  an actuator configured and arranged to be slidably received in said interior of said housing, said actuator being coaxially disposed about said coil and said coil support member, wherein as said actuator is moved in and out of said housing, the inductance of said coil is affected;
  a sensor circuit including an oscillator circuit providing an output signal having a first frequency including:
  said inductor able to change said first frequency to a second frequency;
  first and second capacitors connected in parallel to one another and providing an electrical connection between ground and said variable reactance, said first capacitance having a capacitance having a positive temperature coefficient and said second capacitance having a negative temperature coefficient, wherein said first and second capacitors are selected reduce a temperature induced drift of said first frequency of said oscillator circuit.

2. The sensor of claim 1 wherein said actuator comprising a metal.

3. The sensor of claim 2 wherein said actuator comprising non-ferrous metal.

4. The sensor of claim 1 wherein said actuator comprising a non-metal having a metallic coating thereon.

5. The sensor of claim 4 wherein said metallic coating is of a non-ferrous metal.

6. The sensor of claim 1 wherein said actuator comprising a soft ferrite material.

7. The sensor of claim 1 wherein said actuator includes tapered surfaces.

8. The sensor of claim 1 further comprising:
said coil support member includes a center bore extending into said coil support member and forming a central annular region; and
said actuator including a central projection configured and arranged to be slidably received within said central annular region.

9. The sensor of claim 8 wherein said actuator comprising a non-ferrous metal.

10. The sensor of claim 8 wherein said actuator comprising a non-metal having a metallic coating thereon.

11. The sensor of claim 10 wherein said metallic coating is of a non-ferrous metal.

12. The sensor of claim 8 wherein said actuator comprising soft ferrite material.

13. The sensor of claim 8 wherein said actuator includes tapered surfaces.

14. The sensor of claim 1 wherein the coil of wire is a aluminum magnetic wire with an anodized coating.

15. The sensor of claim 1 wherein the coil of wire is wound upon a bobbin.

16. The sensor of claim 15 further comprising a shell surrounding said bobbin and said coil of wire.

17. The sensor of claim 16 wherein the shell is metallic.

18. The sensor of claim 16 wherein the shell is ceramic.

19. A smart actuator comprising:
an inductor having a variable reactance including:
a housing having an open end, a closed end having a first passageway and an interior chamber;
a coil support member disposed within said interior chamber and having a first end closing affixed to said closed end, a second end, and a second passageway extending through said coil support member from said second end and aligned with said first passageway, wherein said first and second passageway allow communication from said second end to the exterior of said housing;
a coil of wire disposed on said second end having two or more lead wires extending through said second and first passageways from said coil to the exterior of said housing;
an actuator configured and arranged to be slidably received in said interior of said housing, said actuator being coaxially disposed about said coil and said coil support member, wherein as said actuator is moved in and out of said housing, the inductance of said coil is affected;
a first chamber formed between the inner surface of the housing, a forward surface of said actuator, and a seal disposed upon said actuator;
a second chamber formed between the inner surface of the housing, a forward surface of said actuator, and a seal disposed upon said actuator;
a first port coupled to said first chamber and operative to provide an input or output of a driver into said first chamber to affect the position of said actuator;
a second port coupled to said first chamber and operative to provide an input or output of a driver into said second chamber to affect the position of said actuator;
a sensor circuit including an oscillator circuit providing an output signal having a first frequency including:
the variable inductor coupled to said oscillator and able to change said first frequency to a second frequency;
first and second capacitors connected in parallel to one another and providing an electrical connection between ground and said variable reactance, said first capacitance having a capacitance having a positive temperature coefficient and said second capacitance having a negative temperature coefficient, wherein said first and second capacitors are selected reduce a temperature induced drift of said first frequency of said oscillator circuit.

20. The smart sensor of claim 19 wherein the driver is air and the actuator is pneumatically powered.

21. The smart sensor of claim 20 wherein the driver is oil and the actuator is hydraulically powered.

22. The smart sensor of claim 19 wherein the coil of wire is aluminum magnetic wire with an anodized coating.

23. The smart sensor of claim 19 further comprising:
said coil support member includes a center bore extending into said coil support member and forming a central annular region; and
said actuator including a central projection configured and arranged to be slidably received within said central annular region.

24. A method for sensing angular motion comprising:
receiving a rotary motion via a first member;
translating said rotary motion into linear motion;
coupling said linear motion to an actuator to move said actuator relative to a fixed coil, wherein movement of said actuator changes the reactance of said coil;
affecting the frequency of an oscillator circuit by the change in reactance of said coil.

25. The method of claim 24 wherein said step of translating includes driving a worm gear via said rotation of said first member and driving a rack gear by said worm gear.

26. A sensor comprising:
an inductor having a variable reactance including:
a housing having an open end, a closed end having a first passageway and an interior chamber;
a coil support member disposed within said interior chamber and having a first end closing affixed to said closed end, a second end, and a second passageway extending through said coil support member from said second end and aligned with said first passageway, wherein said first and second passageway allow communication from said second end to the exterior of said housing;
a coil of wire disposed on said second end having two or more lead wires extending through said second and first passageways from said coil to the exterior of said housing;
an actuator configured and arranged to be slidably received in said interior of said housing, said actuator being coaxially disposed about said coil and said coil support member, wherein as said actuator is moved in and out of said housing, the inductance of said coil is affected;
a sensor circuit including an oscillator circuit providing an output signal having a first frequency including:
said inductor able to change said first frequency to a second frequency;
a capacitor connected d providing an electrical connection between ground and said variable reactance.

* * * * *

UNITED STATES PATENT AND TRADEMARK OFFICE
CERTIFICATE OF CORRECTION

PATENT NO. : 7,816,911 B2
APPLICATION NO. : 11/940603
DATED : October 19, 2010
INVENTOR(S) : G. Brandt Taylor et al.

It is certified that error appears in the above-identified patent and that said Letters Patent is hereby corrected as shown below:

In column 6, line 53 (claim 1), "selected reduce" should read -- selected to reduce --
In column 8, line 9 (claim 19), "selected reduce" should read -- selected to reduce --
In column 8, line 60 (claim 26), "connected d providing" should read -- connected providing --

Signed and Sealed this

Seventh Day of December, 2010

David J. Kappos
*Director of the United States Patent and Trademark Office*